Figure 1:
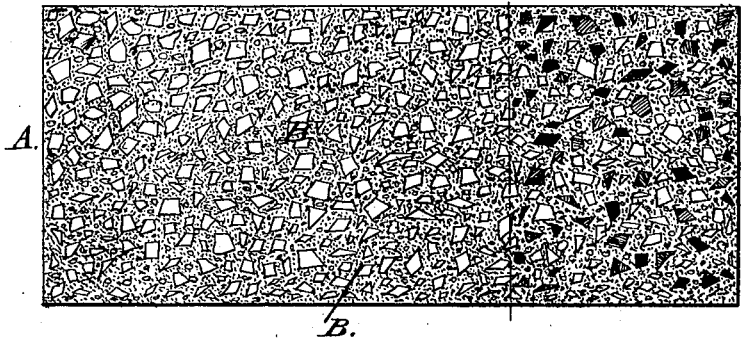

T. & T. HYATT.
Cement and Concrete Walking Surfaces.

No. 206,333. Patented July 23, 1878.

T. & T. HYATT.
Cement and Concrete Walking Surfaces.

No. 206,333.      Patented July 23, 1878.

Witnesses:

Inventor.

3 Sheets—Sheet 3.

T. & T. HYATT.
Cement and Concrete Walking Surfaces.

No. 206,333. Patented July 23, 1878.

Fig. 8¹.

Witnesses:
Inventor:

UNITED STATES PATENT OFFICE.

THADDEUS HYATT AND THEODORE HYATT, OF NEW YORK, N. Y.

IMPROVEMENT IN CEMENT AND CONCRETE WALKING-SURFACES.

Specification forming part of Letters Patent No. 206,333, dated July 23, 1878; application filed July 15, 1878.

*To all whom it may concern:*

Be it known that we, THADDEUS HYATT and THEODORE HYATT, of the city, county, and State of New York, have invented certain new and useful Improvements in Cement, Concrete, and Baked-Clay Walking-Surfaces, with the object of making the same safe as against slipping thereupon, and in modes, means, and processes connected therewith; and that the following is a full, true, and particular description thereof, reference being had to the accompanying drawings, making part of this specification.

The artificial-stone or concrete walking-surfaces in general use are composed of Portland or other hydraulic cement or limes, as the "matrix," with sand and stones of ordinary character, all put together as one mass, and only differing as to surface by being made of finer materials at top, whereas our invention deals with the surface only, and instead of making it finer and smoother, we purposely make it rough and gritty, in order to make it safer to be walked upon in all weathers.

The construction of the slabs may be according to the method of Thaddeus Hyatt, with tensional strength at the bottom, due to tie-metals incorporated therewith, as described in his patent of July 16, 1878, and in an application filed even date herewith, or, as ordinarily made, without metal, our invention consisting in the character of the facing we put upon such slabs; and, again, the artificial-stone or cement and concrete constructions may be in the form of molded blocks, made to be combined with a metallic grating, and, when designed for illuminating purposes, set with glass, according to the invention of Thaddeus Hyatt, our invention with respect to such blocks consisting in the character of the facing we put upon them; and, again, the artificial-stone or concrete slabs or other walking-surface constructions may be a combination of two layers—an under layer or body of ordinary hydraulic-cement concrete and an upper layer or surface of sorel or magnesian cement, according to the invention of Thaddeus Hyatt. Our improvement deals with the surface only, and, as aforesaid, has reference to making the same more safe to be walked upon by making it gritty and rough; and, again, the artificial-stone or concrete slabs or other walking-surface constructions may be party-colored—that is, made up of colored substances, plates, or blocks worked into its surface according to the invention of Thaddeus Hyatt aforesaid.

Our improvement upon such colored-face walking-surfaces consists in making the same gritty and rough, to prevent slipping, our improvement applying equally to concrete and baked-clay illuminating walking-surfaces.

The substances we employ to produce the surfaces aforesaid are crushed burr-millstones, smaltz, corundum or crushed emery-stone, crushed pottery of hard and flinty character, and equivalent materials distinguished for their sharp, hard, and angular and gritty character. These substances may, in some cases, be employed in the form of plates to overlay, or in the form of blocks to inlay, concrete surfaces, or blocks to be set in metal gratings, especially when made of colored and baked clays. When made of the latter the surface is made rough by stamping the surface of the plates or blocks, so as to produce the requisite sharpness, or by embedding crushed pottery or other sharp materials in the face of the clay to be baked, a part of the invention consisting in making channels or water-ways, when desired, in the walking-faces aforesaid, to increase the foot-hold and to make dry walking-surfaces.

Figure 2:
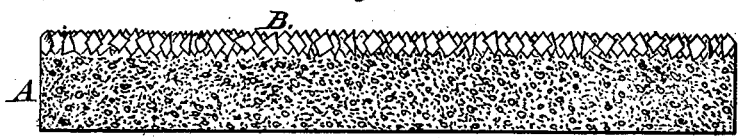
Figure 3:
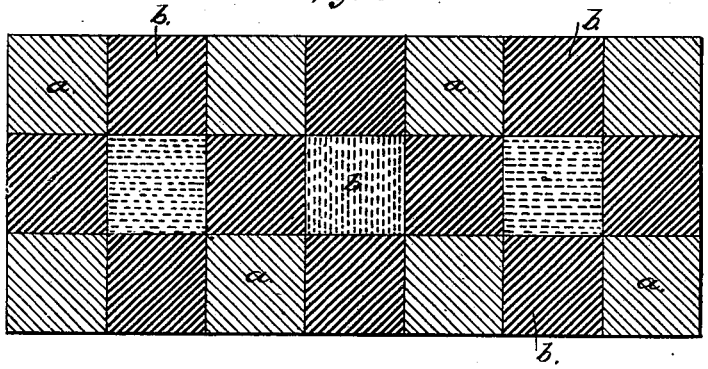
Figure 4:
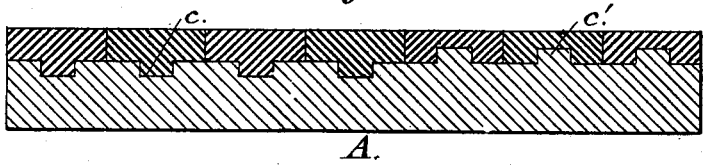
Figure 5:
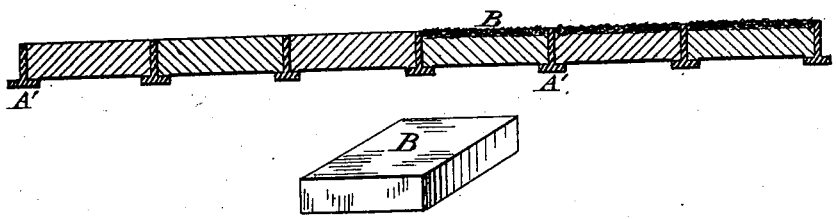
Figure 6:
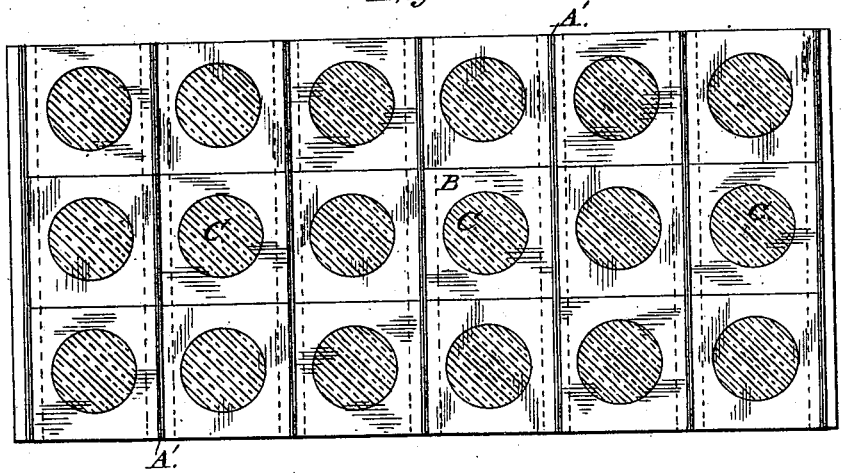
Figure 7:
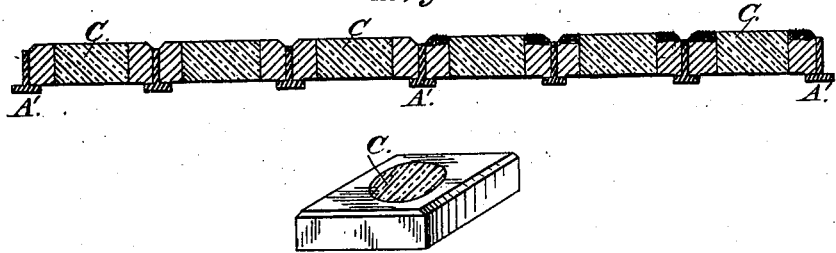
Figure 8:
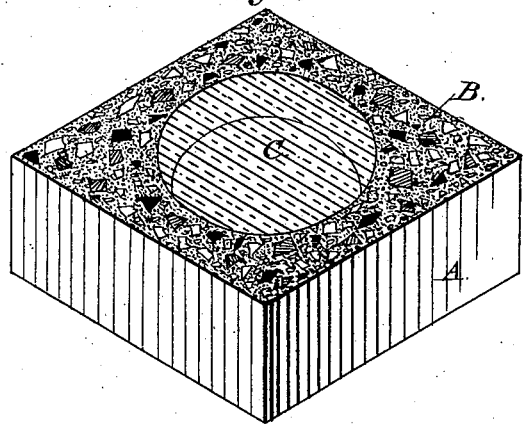
Figure 8:
Figure 9:
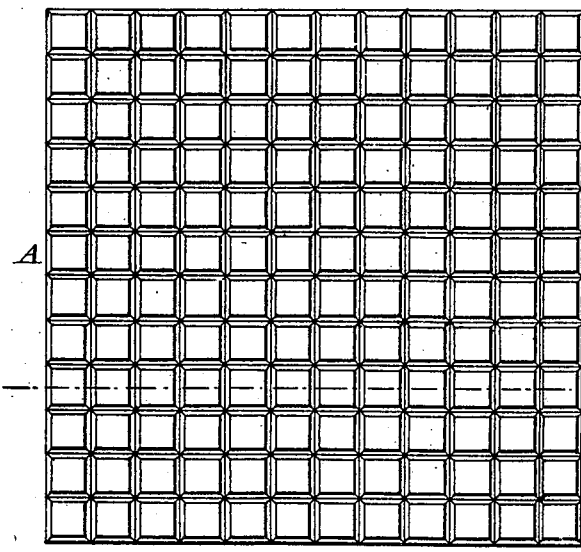
Figure 10:
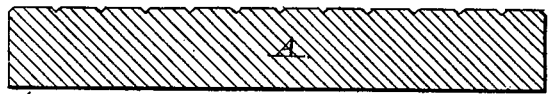

Figures 1 and 2 represent, in plan and cross-section, a concrete slab, A, faced with the foot-holding or wearing face B. Fig. 3 represents a surface in colors, *a a b b* being squares of different colors. For some purposes we form the plates with a key, *c*, on the under side, to interlock with a corresponding indent in the slab A; or the key *c'* may be formed upon A, and then the indent will be upon the plate. Fig. 5 represents a metallic grating, A', foundation in place of A, the apertures of the grating being filled with concrete to a level at or above the metal, and then faced with the foot-holding surface in the form of plates or otherwise; or the concrete may be molded in blocks to fit the apertures of the grating, as shown by Figs. 6 and 7, Fig. 6 being the concrete block, and Fig. 7 the same faced with the gritty material B. Figs. 8 and 8' represent a similar block set with the glass C to give light. Fig. 9 represents in plan, and Fig. 10 in cross-section, a concrete slab formed with the channels or water-ways aforesaid, to make a dry walking-surface.

Where the surface is made up of blocks, such as 6, the edges of such blocks are beveled to form the water-ways aforesaid, as seen in Fig. 7.

Having thus fully described and illustrated our invention, what we claim, and desire to secure by Letters Patent, is—

A roughened or gritty and safe foot-surface formed upon cement, concrete, and baked-clay bodies by modes, means, and processes substantially and for the purposes as herein set forth, and illustrated by our drawings.

THADDEUS HYATT.
THEODORE HYATT.

Witnesses:
WILLIAM ACKERMANN,
YACOB MAUS.